United States Patent

Pohlmann

(10) Patent No.: US 9,455,840 B2
(45) Date of Patent: Sep. 27, 2016

(54) ENHANCED METHOD FOR CONTROLLING NETWORK DEVICES IN A VERY LOW POWER CONSUMPTION STATE

(75) Inventor: Frank Pohlmann, Fellbach (DE)

(73) Assignee: Sony Corporation, Tokyo (JP)

( * ) Notice: Subject to any disclaimer, the term of this patent is extended or adjusted under 35 U.S.C. 154(b) by 251 days.

(21) Appl. No.: 13/448,855

(22) Filed: Apr. 17, 2012

(65) Prior Publication Data

US 2012/0281696 A1 Nov. 8, 2012

(30) Foreign Application Priority Data

May 2, 2011 (EP) .................................. 11164466

(51) Int. Cl.
| | | |
|---|---|---|
| H04L 12/18 | (2006.01) | |
| G06F 1/32 | (2006.01) | |
| H04L 12/12 | (2006.01) | |

(52) U.S. Cl.
CPC .............. *H04L 12/18* (2013.01); *H04L 12/12* (2013.01); *Y02B 60/34* (2013.01); *Y02B 60/35* (2013.01)

(58) Field of Classification Search
CPC ...... G06F 1/26; G06F 1/3203; G06F 1/3206; G06F 1/3209; H04L 45/16; H04L 12/185; H04L 2012/2849; H04L 12/18; Y02B 60/34
USPC .......................... 370/390; 713/300, 310, 323
See application file for complete search history.

(56) References Cited

U.S. PATENT DOCUMENTS

| | | | | |
|---|---|---|---|---|
| 5,404,544 | A * | 4/1995 | Crayford ....................... | 713/310 |
| 5,938,771 | A | 8/1999 | Williams et al. | |
| 6,049,885 | A * | 4/2000 | Gibson et al. ................. | 713/324 |
| 6,311,276 | B1 * | 10/2001 | Connery et al. ................... | 726/2 |
| 6,493,824 | B1 * | 12/2002 | Novoa et al. ................. | 713/162 |
| 8,407,332 | B1 * | 3/2013 | Kraipak et al. ................ | 709/223 |
| 2002/0157030 | A1 * | 10/2002 | Barker et al. ................. | 713/320 |
| 2003/0188012 | A1 * | 10/2003 | Ford .............................. | 709/238 |
| 2005/0015423 | A1 * | 1/2005 | D'Arcy et al. ............... | 708/530 |
| 2005/0144493 | A1 * | 6/2005 | Cromer et al. ............... | 713/310 |
| 2008/0074411 | A1 * | 3/2008 | Yamashita ..................... | 345/211 |
| 2008/0104424 | A1 * | 5/2008 | Jennings ....................... | 713/300 |
| 2008/0313481 | A1 * | 12/2008 | Paljug .......................... | 713/323 |
| 2009/0063878 | A1 * | 3/2009 | Schmidt et al. .............. | 713/310 |
| 2009/0172443 | A1 * | 7/2009 | Rothman .............. | G06F 1/3209 713/323 |
| 2010/0250914 | A1 * | 9/2010 | Abdul et al. .................. | 713/100 |

(Continued)

OTHER PUBLICATIONS

"Magic Packet Technology", AMD, White Paper, Nov. 1995, 6 pages.

*Primary Examiner* — Scott M Sciacca
(74) *Attorney, Agent, or Firm* — Oblon, McClelland, Maier & Neustadt, L.L.P

(57) ABSTRACT

The present invention relates to a method for controlling network devices in a low power consumption state, comprising the steps of: generating a network packet to be transmitted over a network to the network devices, the network packet containing at least a data portion, wherein said data portion comprises a preamble portion, and a sequence of n identical hardware multicast or broadcast address portions. The invention also relates to a method for controlling network devices in a very low power consumption state, comprising the steps of: generating a network packet to be transmitted over a network to the network devices, the network packet containing at least a data portion, wherein said data portion comprises a preamble portion, a sequence of n identical hardware unicast address portions, a password portion and a network and/or device address portion.

16 Claims, 2 Drawing Sheets

(56) References Cited

U.S. PATENT DOCUMENTS

| | | | |
|---|---|---|---|
| 2011/0167473 A1* | 7/2011 | Evans et al. | 726/1 |
| 2011/0239022 A1* | 9/2011 | Tokoro | 713/323 |
| 2012/0099600 A1* | 4/2012 | Tsai | 370/401 |
| 2014/0156994 A1* | 6/2014 | Sakuma | 713/171 |

\* cited by examiner

ENHANCED METHOD FOR CONTROLLING NETWORK DEVICES IN A VERY LOW POWER CONSUMPTION STATE

CROSS-REFERENCES TO RELATED APPLICATIONS

The present application claims the benefit of the earlier filing date of EP 11 164 466.2 filed with the European Patent Office on May 2, 2011, the entire content of which application is incorporated herein by reference.

FIELD OF INVENTION

The present invention relates to a method for controlling network devices in a low-power consumption state. The invention also relates to a structure of a network packet, a transmitter unit of a network device and a receiver unit of a network device.

BACKGROUND OF THE INVENTION

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention Nowadays, most of the electronic devices, particularly multimedia devices, like personal computers, TV sets, DVD players, etc., are equipped with a so-called standby mode which keeps a limited functionality "alive" while the power consumption is very low, generally below 1 W. For example, the limited or restrictive functionality allows to switch on a device via a remote control, or to wake up a network device by a certain data packet transmitted via the network. One of such techniques is called "wake on LAN" which is an Ethernet computer networking standard that allows a computer to be turned on or woken up by a network message. This network message is an Ethernet frame containing a specific data pattern. This specific data pattern may be detected by the network controller on the receiving end even if the receiving end is in the low power consumption state. The network controller then alerts the system and the power management circuitry wakes it up. In the art an Ethernet frame containing this specific data pattern is called a "magic packet" and the general data structure of such a specific data pattern is shown in FIG. 5.

Generally, a network device when set in the magic packet mode (standby mode), scans all incoming frames even when not addressed to the node for a specific data sequence which indicates the network device that this is a magic packet frame. A magic packet frame must also meet the basic physical layer requirements for the LAN technology chosen, such as bit timings. The specific sequence which is embedded in the payload or data portion of an Ethernet frame for example consists of sixteen duplications of the MAC address of the network device to be awakened, with no breaks or interruptions. This sequence of sixteen duplications of the MAC address must be preceded by a synchronization stream (preamble) which allows the scanning state machine to be much simpler. This synchronization stream or preamble is defined as six bytes of FF in the hexadecimal format (binary value: 1111 1111).

The magic packet technology is a very popular approach to control network devices in a low-power consumption state. This technology allows to switch on a network device from a low-power consumption state in a normal or high-power consumption state by just sending the magic packet over the network. However, any other control of a network device being in the low power consumption state is not possible.

For the implementation of certain applications it is appreciated being able to control network devices within a network environment. However, in today's network environments this control is typically restricted to a state in which the network devices being controlled consume high power. Hence, there is a demand to overcome the restrictions of the magic packet technology while enabling a wide range of control of a wide range of devices.

SUMMARY OF INVENTION

It is an object of the present invention to provide a method for controlling network devices in a low-power consumption state which allows a wide range of control of a wide range of devices in a network environment.

This object is solved by a method for controlling network devices in a low-power consumption state, comprising the steps of: generating a network packet to be transmitted over a network to the network devices, the network packet containing at least a data portion, wherein said data portion comprises a preamble portion and sequence of n identical hardware multicast or broadcast address portions.

The use of a multicast or broadcast address allows to control not only one but several network devices with sending one data packet. This is in contrast to the magic packet technology which is restricted to address one single network device with one magic packet. Although this extension has significant advantages, the required hardware circuitry changes are small due to the fact that the magic packet technology hardware could be further used.

In the context of the present application, "network packet" is to be understood as a data pattern defined by a sequence of binary data (bits), the data pattern meeting at least the requirements of the physical layer, e.g. bit-timings etc., of the ISO/OSI reference model. However, such a "network packet" may also be part of a higher-level datagram of the ISO/OSI reference model containing e.g. source and destination addresses, etc. like an Ethernet packet.

The object of the present inventions is also solved by a method for controlling network devices in a low-power consumption state, comprising the steps of: generating a network packet to be transmitted over a network to the network devices, the network packet containing at least a data portion, wherein said data portion comprises a preamble portion, a sequence of n identical hardware unicast address portions, a password portion and a network and/or a device address portion.

The usage of a password has the advantage that it is possible to prevent control of devices from an unknown initiator. Only if the password contained in the data portion matches a password stored in the network device, the network device takes notice of the received packet and runs a certain function. Further, the incorporation of a network and/or a device address portion of the initiator may be used to distinguish between different networks, different sub-networks or different logical networks within an overall network, for example different HDMI-HEC networks within a local area network (LAN). The device address can be used to distinguish different devices for example in the overall network, in sub-networks or in logical networks depending on the type of a device address.

Incorporating a password portion and a network and/or device address portion in the data portion may also be possible in the case that the data portion comprises a sequence of n identical hardware multicast or broadcast address portions.

In a further embodiment, said data portion further comprises a control tag portion, said control tag portion comprising at least one control tag.

The incorporation of at least one control tag can either be used to control certain device capabilities (e.g. the external network connection of a HDMI-HEC device) and/or certain device states (e.g. power states, capability states, etc.). That is in other words that the control tag allows to specify a certain function to be performed by the receiving network device.

Hence, the restriction of the magic packet technology on just one function, namely to switch into a high power consumption state is overcome.

Hence, the range of network devices being in a low-power consumption state is significantly extended.

In a further preferred embodiment, the data portion of a received network packet is scanned without leaving the low-power consumption state, and the preamble portion and the hardware address portions are each compared with a predetermined value set in the respective network device. Preferably, the step of comparing is performed by a state machine.

The use of a state machine is—in terms of hardware requirements—a simple solution which may be implemented in a network device easily.

It is also an object of the present invention to provide a data structure of a network packet allowing a method for controlling network devices.

This object is solved by a data structure comprising at least a data portion, wherein said data portion comprises a preamble portion and a sequence of n identical hardware multicast or broadcast address portions.

The object is also solved by a data structure, comprising at least a data portion, wherein said data portion comprises a preamble portion, a sequence of n identical hardware unicast address portions, a password portion and a network and/or device address portion.

As already pointed out in connection with the inventive method, such a data structure allows to extend the range of control functions which may be identified by a network device in the low power consumption state.

In a preferred embodiment, said data portion of the data structure comprises a control tag portion.

The object of the present invention is also solved by a transmitter of a network device comprising a network packet generator adapted to generate a network packet having the data structure according to the present invention.

The object of the present invention is also solved by a receiver of a network device having a hardware address, comprising a network packet scanner adapted to scan in a low consumption state the received data portion of a network packet having a data structure according to the present invention, and an evaluator adapted to evaluate in a low consumption state whether the scanned data portion contains a sequence of n identical hardware address portions, the value of the hardware address portion corresponding to the hardware address of the network device, a password portion corresponding to a password stored in the network device and to pass the at least one control tag and preferably the network and/or a device address to a controller unit for performing a function corresponding to the at least one control tag.

Preferred embodiments of the invention are defined in the dependent claims. It shall be understood that the features defined in the dependent claims may be combined with each other arbitrarily and that the features defined in a single claim may be used separately. It is to be understood that the features mentioned above and those yet to be explained below can be used not only in the respective combinations indicated, but also in other combinations or in isolation, without leaving the scope of the present invention.

It is to be understood that both the foregoing general description of the invention and the following detailed description are exemplary, but are not restrictive, of the invention.

Embodiments of the invention are shown in the drawings and will be explained in more detail in the description below with reference to same.

BRIEF DESCRIPTION OF DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF PREFERRED EMBODIMENTS

Figure 1:
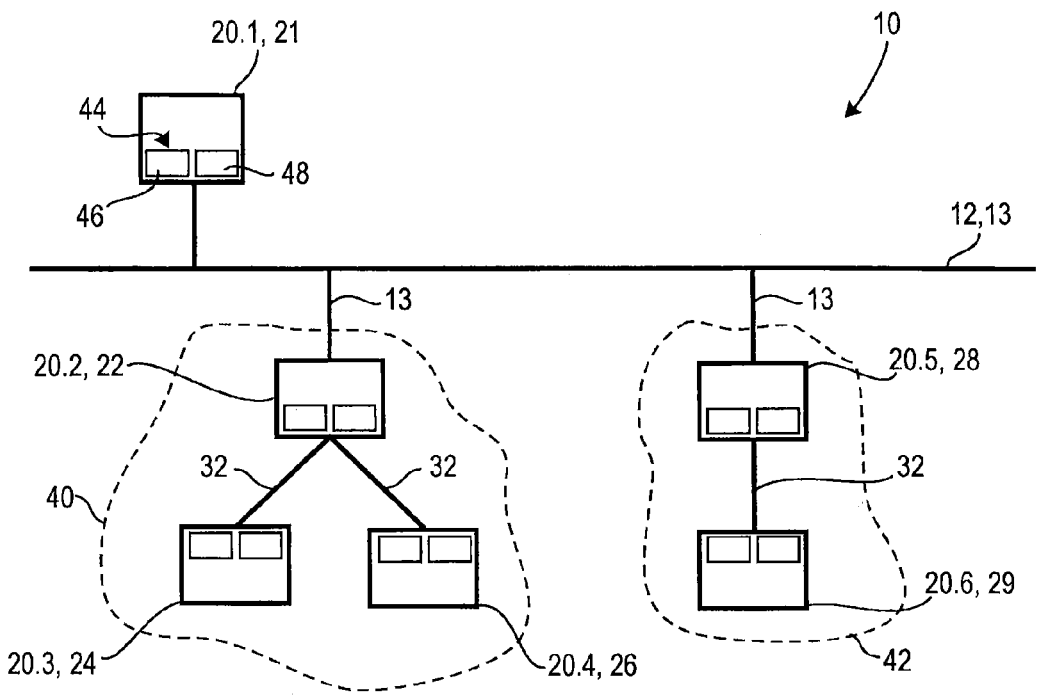
FIG. 1 shows a schematic diagram of a network environment comprising several network devices.

In FIG. 1 a typical network environment is schematically shown and indicated with reference numeral 10. The network environment 10 comprises a wired based network 12, preferably an Ethernet based network 13.

In the present embodiment, three network devices 20.1, 20.2 and 20.5 are connected to the network 12, preferably by wire.

The network device 20.1 is preferably a personal computer 21 and the network devices 20.2 and 20.5 are preferably television sets 22, 28. The TV set 22 is part of a sub-network 40 which further comprises two network devices 20.3 and 20.4, both connected to the TV set 22 for example via HDMI connections 32. For example, the network device 20.3 is a Blu-Ray player 24 and the network device 20.4 is a set top box 26.

The TV set 28 is part of a further sub-network 42 which further comprises a network device 20.6, for example a DVD player 29. The DVD player 29 is connected to the TV set 28 via HDMI 32.

Hence, the network environment 10 comprises an Ethernet-based Local Area Network (LAN) 12, 13 and two HDMI-based sub-networks 40, 42.

It is to be appreciated that the network environment 10 of FIG. 1 is just an example and it should not be construed as limiting the present invention to such an environment. It would for example be possible that the network environment only comprises an Ethernet-based network without HDMI-connected devices. Alternatively, the network environment could also be a HDMI-based network comprising HDMI devices only.

Generally, up to date network devices, like TV sets, personal computers, etc. are designed to have a low-power consumption state, which is also known as standby or suspended mode. The low-power consumption state has the characteristic that only some circuitry is powered so that only one function, namely to wakeup the device, is available. This wakeup could be achieved in the prior art by transmitting a magic packet via the Ethernet network to the desired network device.

A data structure, as will be described in detail below, of a "network packet" (i.e. a data pattern) to be transmitted to a desired network device allows to increase the flexibility of control of network devices even if they are in a low-power consumption state. The data structure will now be described with reference to FIGS. 2, 3 and 4. As described above, "network packet" is to be understood as a data pattern defined by a sequence of binary data (bits), the data pattern meeting at least the requirements of the physical layer, e.g. bit-timings etc., of the ISO/OSI reference model. However, such a "network packet" may also be part of a higher-level datagram of the ISO/OSI reference model containing e.g. source and destination addresses, etc.

Figure 4:
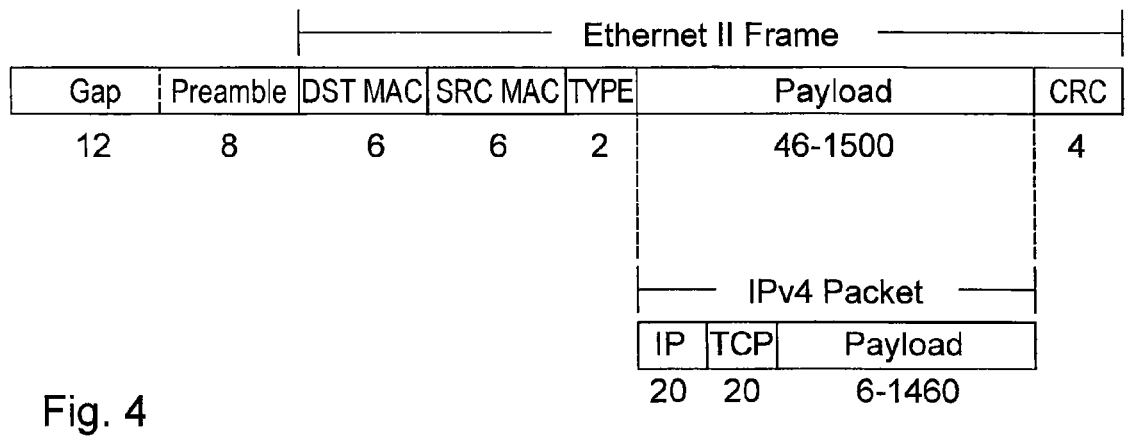
FIG. 4 shows the general structure of a network packet, particularly an Ethernet packet.

As already mentioned before, an Ethernet network 13 uses Ethernet packets for communication. Such Ethernet packets generally comprise an Ethernet frame, as shown in FIG. 4. The Ethernet frame comprises a destination address (DST MAC), a source address (SRC MAC), a payload containing the data to be transmitted and some further information, for example for a redundancy check (CRC). Since the general structure of an Ethernet packet is well-known in the art, it is referred thereto and it is refrained from explaining it in more detail hereinafter.

Figure 2:
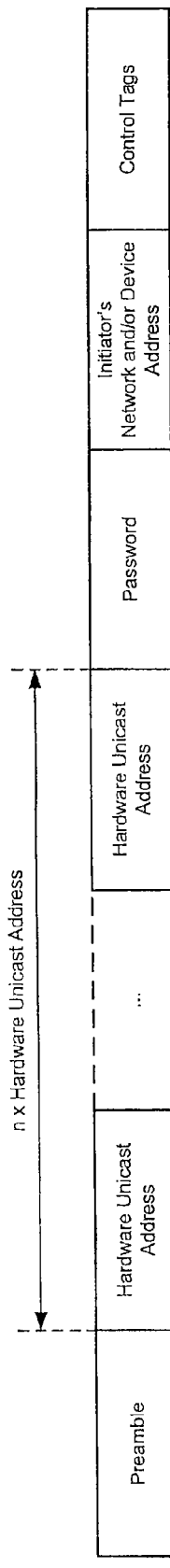
FIG. 2 shows the data structure of a data portion of a network packet according to a first embodiment.
Figure 3:
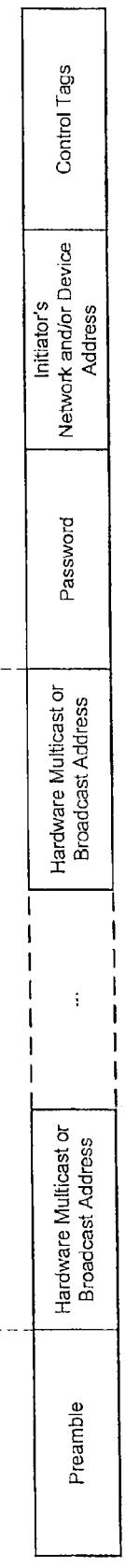
FIG. 3 shows the data structure of a data portion of a network packet according to a second embodiment.

In the payload (also called data portion of the Ethernet frame), a data pattern (i.e. a network packet) having the structure as shown in FIG. 2 or 3 is embedded. This data structure allows to control network devices 20 even if the respective network devices are in the low-power consumption state.

The data structure according to FIG. 2 comprises a preamble portion, a sequence of n address portions, a password portion, an initiator's network and/or device address portion and a control tags portion.

Figure 5:
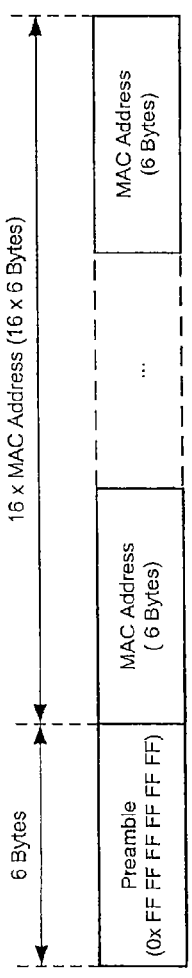
FIG. 5 shows the data structure of a magic packet.

The preamble portion comprises a sequence of bits in order to ease the synchronisation of a receiver unit to the data sequence. For example, the preamble may comprise 48 bits (6 bytes) with the value "1". The preamble according to this data structure may correspond to the preamble of the magic packet as shown in FIG. 5 and described above.

The address portions contain a hardware unicast address of a network device as shown in FIG. 2 or alternatively as shown in FIG. 3 a multicast or broadcast address. The address corresponds to the hardware address of the desired network device (in the unicast case), the address of a group of network devices (multicast case) or a hardware address addressing all network devices (broadcast case).

This address portion is repeated n times in identical form and without any gaps. For example, the address portion may be repeated sixteen times which corresponds to the magic packet technology.

The repetition of the hardware address within the data structure is done in order to reduce the probability that other data sequences assemble a respective data sequence coincidentally.

As already mentioned before, a unicast address addresses a specific network device within the network whereas a multicast address addresses a certain group of devices and a broadcast address all devices within a network.

The next portion is the password portion comprising a password. The usage of a password prevents the control of devices from an unknown initiator.

The following portion may contain a network and/or device identifier/address of the initiator, that is the network device transmitting such an Ethernet frame.

The network identifier/address may be used to distinguish between different networks, different sub-networks or different logical networks within an overall network, for example different HDMI-HEC networks (in this case, an identifier in addition to the address is used to identify a device in a sub-network) within a local area network, as it is for example the case in FIG. 1. The device identifier/address may be used to distinguish different devices for example in the overall network, in sub-networks or in logical networks depending on the type of the device identifier/address.

Finally, the control tags may contain information to be used to control certain device capabilities and/or certain device states.

It is now referred again to FIG. 1. In a scenario in which a user at the personal computer 21 would like to switch the TV sets 22 and 28 in the high power consumption state ("on" state), the user operates a software which generates an Ethernet frame with the payload having the structure as shown in FIG. 3. In particular, the payload comprises a sequence of for example 16 hardware multicast address portions, wherein the hardware multicast address is selected such that both TV sets 22 and 28 are addressed. The password comprises for example the passwords of the network devices 20 to be controlled, in the present case the passwords configured in the TV sets 22 and 28. Preferably the respective passwords may be pre-configured in the personal computer 21 or alternatively be requested from the user before transmitting the network packet.

It is to be noted that a password may only be used if this security feature is desired.

In the next portion, the address of the PC 21 may be contained. Finally, the control tag portion comprises a value which indicates that the receiving network devices, here the TV sets 22 and 28, should perform the function "switch on".

In a further scenario, the user of the TV set 22 may have the wish to switch on the TV set 28, to enable the HDMI-HEC connection between the TV 28 and the DVD player 29 and to start the DVD player 29 in order to start streaming a movie to TV set 22 for viewing.

In this scenario, the TV set 22 generates a first Ethernet frame with the payload having the structure as shown in FIG. 2. In particular, the payload comprises a sequence of for example 16 hardware unicast address portions, wherein the hardware unicast address is selected such that the TV set 28 is addressed. The control tag portion is filled with the information that the TV set 28 should perform the function "switch on" and should enable the HDMI-HEC connection between TV set 28 and DVD player 29.

Finally, the TV set 22 generates a second Ethernet frame with the payload having the structure as shown in FIG. 2. In particular, the payload comprises a sequence of for example 16 hardware unicast address portions, wherein the hardware unicast address is selected such that the DVD player 29 is addressed. The control tag portion is filled with the information that the DVD player 29 should perform the function "switch on" and should start streaming video content to the TV set 22.

The generation of the Ethernet frame having the payload with a data structure described above is carried out by a network controller 44, particularly its transmitter unit 46.

Each network device is equipped with such a network controller and its receiver unit is adapted to scan the data packets transmitted over the network. Even if the respective network device is in the low-power consumption state, the network controller 44 is further energized to at least scan the data packets. Further, the receiver unit is adapted to identify the data structure as shown in FIG. 2 or 3. In the event that the hardware address portion corresponds to the hardware address of the network controller, the following data portions are also scanned. In the event that the scanned address portion contains a value unequal to the hardware address of the network controller, the data packet is discarded.

If the hardware address, the password and the initiator's network and/or device address correspond to the respective values assigned to the network controller, the last portion of the data structure, namely the control tag is evaluated. Depending on the value contained in this portion, the receiver unit generates a control signal which is transmitted to the respective units of the network device, for example the power unit and the controller.

The circuitry necessary for scanning and identifying/ evaluating the information in the payload may be based on the magic packet technology with some further extensions.

To sum up, the present invention makes use of the advantages of the magic packet technology while additionally enhancing the technology in the following ways:

being able to control a group of devices or all devices within a network simultaneously by using multicast/broadcast hardware addresses adding security by adding a password that prevents control from unknown initiators possibility to distinguish between networks, sub-networks and/or logical networks by adding initiators network identifier/address possibility to distinguish between devices, sub-devices and/or logical devices by adding initiators device identifier/ address that is different from its hardware address possibility to control a wide range of device capabilities and device states by adding control tags.

The embodiment described above is based on transmitting said data structure as part of the payload portion of an Ethernet frame. However, it is not mandatory to incorporate the data structure into an Ethernet frame; rather it would also be possible to transmit the data structure shown in FIG. 2 or 3 as it is without any preceding or succeeding data.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A method for controlling a media output device, the method comprising:
    generating, by circuitry, a network packet including a data portion, the data portion including
        a sequence of n identical hardware multicast or broadcast address portions that follows a preamble portion, each of the n identical hardware multicast or broadcast address portions is the network address of the media output device,
        a password portion that follows the sequence of n identical hardware multicast or broadcast address portions,
        an origin address portion that follows the password portion and that includes a network address of the circuitry, and
        a control tag portion;
    transmitting, by the circuitry, the network packet to the media output device over a local area network (LAN) that is separate from an audio/video data channel to the media output device;
    receiving, by the media output device, the network packet;
    comparing, by the media output device, the password portion and the origin address portion of the network address packet with predetermined values stored in the media output device; and
    performing, by the media output device when the password portion and the origin address portion of the network packet match the predetermined values, one or more functions in response to a control tag in the control tag portion of the network packet.

2. The method according to claim 1, further comprising:
    scanning, by the media output device, the data portion of the network packet while in a low power consumption state
    comparing, by the media output device, one of the n identical hardware multicast or broadcast address portions of the network packet with a predetermined value set in the media output device.

3. The method according to claim 2, wherein the comparing by the media output device is performed by a state machine.

4. The method according to claim 1, wherein a function of the one or more functions is to control the media output device in a low power consumption state.

5. The method according to claim 1, wherein n is at least 16.

6. The method according to claim 1, wherein said data portion further includes a preamble portion containing six bytes that each have a hexadecimal value FF.

7. The method according to claim 1, wherein the LAN is configured to transmit and receive data and the audio/video data channel is configured to receive an audio/video data transmission.

8. The method according to claim 1, wherein the sequence of n identical hardware multicast or broadcast address portions directly follows the preamble portion, the password portion directly follows the sequence of n identical hardware multicast or broadcast address portions, and the origin address portion directly follows the password portion.

9. The method according to claim 1, wherein each identical hardware multicast or broadcast portion of the n identical hardware multicast or broadcast address portions directly precedes or succeeds another identical hardware multicast or broadcast portion of the n identical hardware multicast or broadcast address portions.

10. A control device for controlling a media output device, the control device comprising:
- processing circuitry configured to generate a network packet including a data portion, the data portion including
  - a sequence of n identical hardware multicast or broadcast address portions that follows a preamble portion, each of the n identical hardware multicast or broadcast address portions is the network address of the media output device,
  - a password portion that follows the sequence of n identical hardware multicast or broadcast address portions,
  - an origin address portion that follows the password portion and that includes a network address of the device, and
  - a control tag portion; and
- a transmitter that transmits the network packet to the media output device over a local area network (LAN) that is separate from an audio/video data channel to the media output device, wherein
- in response to receiving the network packet, the media output device is configured to
  - compare the password portion and the origin address portion of the network address packet with predetermined values stored in the media output device, and
  - perform, when the password portion and the origin address portion of the network packet match the predetermined values, one or more functions in response to the value in the control tag portion of the network packet.

11. The control device according to claim 10, wherein the processing circuitry is configured to generate the network packet including the data portion having a preamble portion containing a sequence of at least 48 bits with value "1".

12. The control device according to claim 10, wherein n is at least 16.

13. The control device according to claim 10, wherein said network packet is part of a payload of an Ethernet frame.

14. The control device according to claim 10, wherein each identical hardware multicast or broadcast portion of the n identical hardware multicast or broadcast address portions directly precedes or succeeds another identical hardware multicast or broadcast portion of the n identical hardware multicast or broadcast address portions.

15. A receiver of a media output device having a hardware address, the receiver comprising:
- a receiver configured to receive a network packet over a local area network (LAN) that is separate from an audio/video data channel, the network packet transmitted by a transmitting device; and
- processing circuitry configured to
  - scan a data portion of the network packet, the data portion including
    - a sequence of n identical hardware multicast or broadcast address portions that follows a preamble portion,
    - a password portion that follows the sequence of n identical hardware multicast or broadcast address portions,
    - an origin address portion that follows the password portion and that includes a network address of the transmitting device, and
    - a control tag portion;
  - determine whether a value of a hardware multicast or broadcast address portion in the sequence of n identical hardware multicast or broadcast address portions in the data portion corresponds to a hardware multicast or broadcast address of the media output device;
  - compare, when at least one value of n identical hardware multicast or broadcast address portions corresponds to the hardware multicast or broadcast address of the media output device, the password portion and the origin address portion in the data portion with predetermined values stored in the media output device; and
  - perform, when the password portion and the origin address portion of the network packet match the predetermined values, one or more functions corresponding to a control tag in the control tag portion.

16. The receiver according to claim 15, wherein each identical hardware multicast or broadcast portion of the n identical hardware multicast or broadcast address portions directly precedes or succeeds another identical hardware multicast or broadcast portion of the n identical hardware multicast or broadcast address portions.

* * * * *